United States Patent [19]

Moneta

[11] 3,962,931
[45] June 15, 1976

[54] TELESCOPIC STEERING COLUMN
[75] Inventor: Casimir Moneta, Chicago, Ill.
[73] Assignee: International Harvester Company, Chicago, Ill.
[22] Filed: Mar. 21, 1975
[21] Appl. No.: 560,905

[52] U.S. Cl. .................................. 74/493; 74/531
[51] Int. Cl.² ...................... B62D 1/18; G05G 5/22
[58] Field of Search ............................. 74/493, 531

[56]  References Cited
UNITED STATES PATENTS

| | | | |
|---|---|---|---|
| 2,218,841 | 10/1940 | Bluemel | 74/493 |
| 3,338,607 | 8/1967 | Broadhurst, Jr. | 74/531 X |
| 3,570,322 | 3/1971 | Krouse | 74/493 |

FOREIGN PATENTS OR APPLICATIONS

| | | | |
|---|---|---|---|
| 846,561 | 8/1960 | United Kingdom | 74/493 |
| 494,902 | 11/1938 | United Kingdom | 74/493 |
| 764,577 | 12/1956 | United Kingdom | 74/493 |
| 669,818 | 4/1949 | United Kingdom | 74/493 |
| 875,266 | 8/1961 | United Kingdom | 74/493 |

Primary Examiner—Allan D. Herrmann
Attorney, Agent, or Firm—Douglas W. Rudy; Floyd B. Harman

[57]  ABSTRACT

A telescopically adjustable steering column includes a locking wedge positioned by a collar which applies locking force to a steering shaft having an externally splined lower portion mated with an internally splined tube connected to a steering pump.

10 Claims, 4 Drawing Figures ary, 931

TELESCOPIC STEERING COLUMN

BACKGROUND OF THE INVENTION

1. Field of the Invention

This invention relates to adjustable steering mechanisms and more specifically to axially extensible steering column assemblies having a locking mechanism for fixing the axial position of the steering wheel.

2. Description of the Prior Art

Telescoping steering column assemblies are known and have become common accessories in several types of vehicles as they provide some desirable advantages. Extensibly adjustable steering columns are most frequently seen in automobiles, however, an increasing number of industrial or farm vehicles such as trucks, tractors, and fork trucks are being offered with adjustable columns. Among the advantages inherent in an adjustable column is the convenience of having the steering wheel located in position to satisfy the personal preferences of various operators. The usual and well known telescopic steering wheel is composed of a tube slidably carried inside a second tube. The first tube is connected to the steering wheel and the second tube is connected to a steering gear apparatus that translates the rotary motion of the first tube into motion to steer a vehicle. Both tubes are incorporated together by any of a multitude of complicated devices which usually use levers, wedges, pins, or expandable legs to act as a locking means. Even steering wheel adjustment apparatus that only telescope extensibly are usually complex and consequently expensive to manufacture.

Tiltable steering wheels often include a telescopic adjustment, however, these combinations are even more complicated and expensive to manufacture than the telescopically adjustable devices.

SUMMARY OF THE INVENTION

According to the present invention an improved axially extensible steering column is provided. More specifically, a steering column of the present invention has an improved system of holding the steering wheel in a desired position through the use of a simple locking collar and a circular split wedge.

Another feature of the invention resides in the use of an externally splined steering shaft and an internally splined steering shaft housing tube to minimize the occurrence of any inaccuracy in the steering mechanism. These splines of the steering shaft engage the splines of the tube in close fitting relationship thereby eliminating unwanted lash between the steering wheel and the steering box.

Another advantage of the proposed invention is that adjustment is easy, safe, and smooth with either hand even when the vehicle is moving, as the locking collar, which has externally cast protrusions for affording a good gripping surface, need only be rotated a portion of a turn to lock or unlock the mechanism.

Still another feature of the invention is that there is little possibility of the steering wheel being lifted out of the steering column housing.

Further features of the invention are that the assembly has few operating parts, is rust proof has no external linkages to get out of adjustment, and is easy to assemble and service.

BRIEF DESCRIPTION OF THE DRAWINGS

The preceding and other features and advantages of the invention will be apparent from the following specification and from the appended drawings wherein.

DETAILED DESCRIPTION OF THE INVENTION

Figure 1:
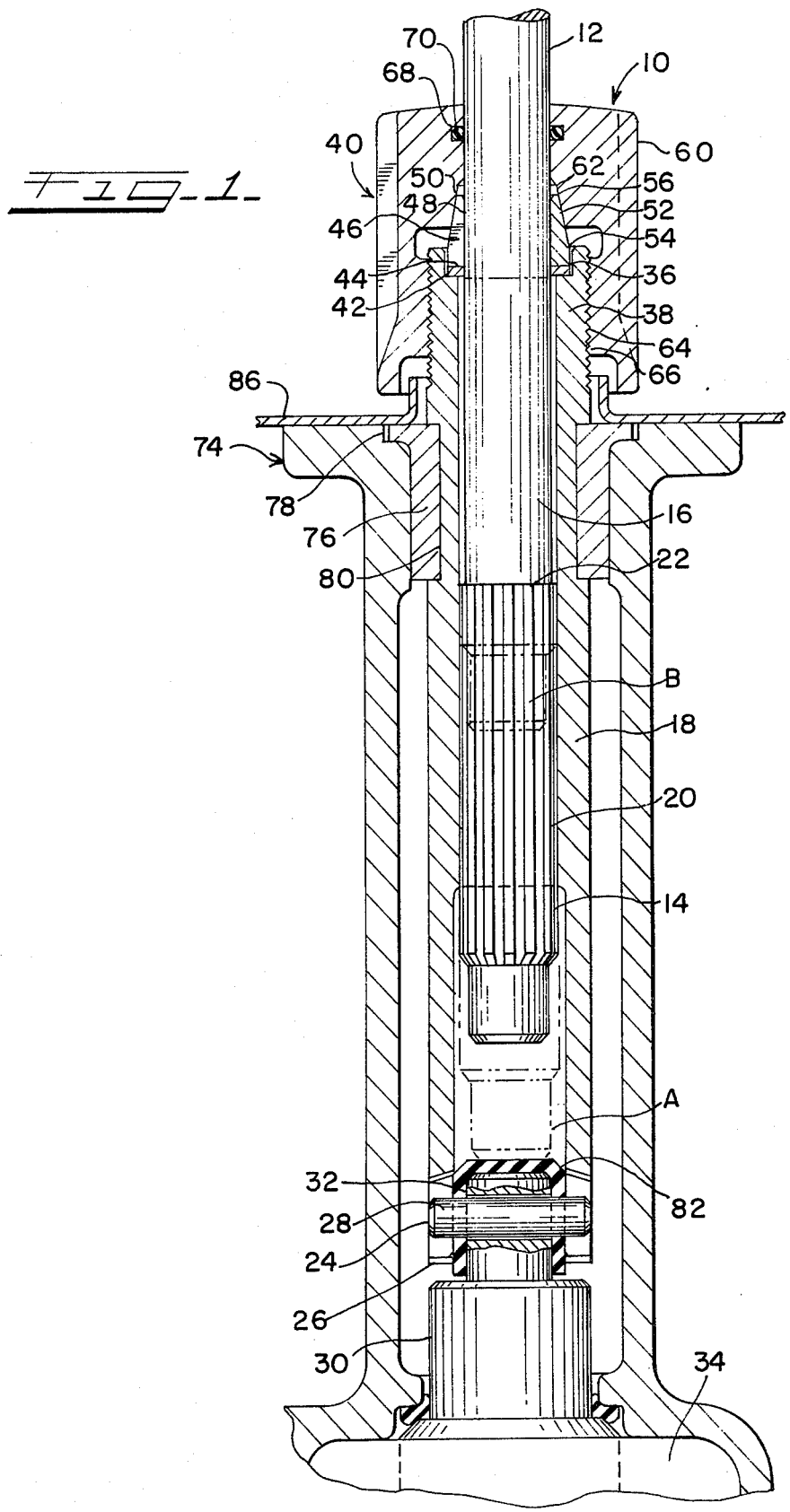
FIG. 1 is a cross sectional view of a portion of an adjustable steering column assembly.

The cooperative arrangement of the adjustable steering column means can be seen in FIG. 1 wherein the adjustable steering column assembly is generally indicated by 10 and more specifically is composed of a steering shaft 12, having an externally splined lower portion 14, a smooth surfaced upper portion 16, slidably and telescopically carried in a tube 18 which is internally splined as shown by 20. These splines are dimensionally compatible with the splines at the lower portion of the steering shaft. A steering wheel means (not shown) would generally be affixed to the upper termination point (also not shown) of the steering shaft 12. The smooth surfaced upper portion 16 is of a smaller circumference than the splined lower portion 14 of the steering shaft 12 as shown by margin 22.

The tube 18 has an aperture 24 at its lowest portion 26 for receiving a coupling pin 28 which fixes a steering box means shaft 30 having an apertured upper end 32 for receiving the coupling pin 28. The steering box means 34 is not limited to any specific type or apparatus and could be hydraulic, hydrostatic, pneumatic, or mechanical such as a recirculating ball or a rack and pinion, or any other type of transfer mechanism that would convert steering shaft rotational input into vehicle steering motion.

Thus, it is apparent that rotational movement of the steering shaft 12 will be transferred to a tube 18 by the means provided by the externally splined lower portion 14 of the steering shaft 12 and its cooperative interaction with the internally splined tube 18. Furthermore, axial rotation of the steering shaft 12 and the tube 18 will communicate axial rotation to the steering box means 34 as the steering box means shaft 30 is coupled to the lower portion 26 of the tube 18 with the coupling pin 28 passing through the tube aperture 24 and the apertured upper end 32 of the steering box means shaft 30.

It is also apparent from FIG. 1 that the steering shaft 12 can be telescopically adjusted through tube 18 without severing engagement or loosing rotational transferability between the steering shaft 12, the tube 18, and the steering box means shaft 30.

Figure 4:
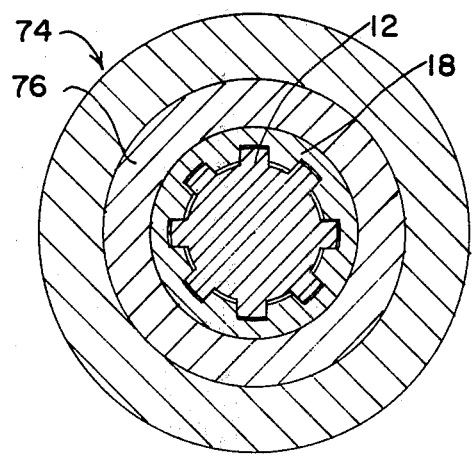
FIG. 4 is a sectional view taken generally along the plane designated as 4—4 of FIG. 2.

FIG. 4 clearly shows the splined configuration and the relationship of the steering shaft 12 and the tube 18.

Figure 2:
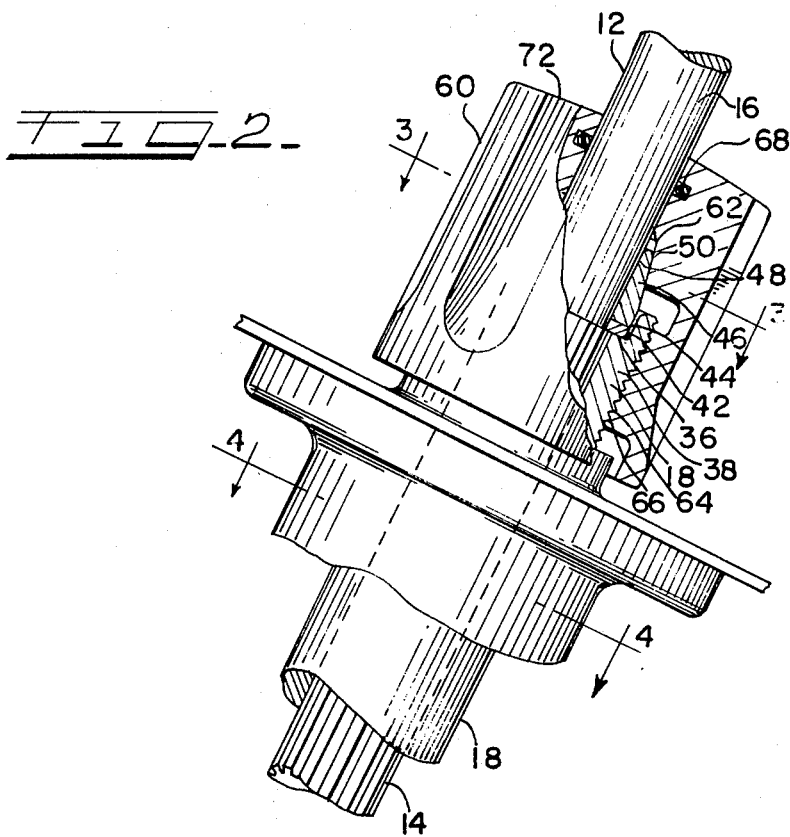
FIG. 2 is a partially fragmented and sectioned portion of the upper part of the adjustable steering shaft assembly.

Returning to FIG. 1 the method of locking or clamping the steering shaft 12 in a desired telescoped position will be apparent when the components of the locking assembly, generally indicated by 40, are cooperatively associated with the steering shaft 12 and the tube 18. The view of FIG. 2 will also be helpful in representing the locking assembly.

The tube 18 has a counterbored recess 36 formed in its upper end 38 which provides a positioning means for a steering shaft washer 42 which has an inside circumference nominally the same as the circumference of the smooth surfaced upper portion 16 of the steering shaft 12 which is, as pointed out earlier, smaller than the circumference of the externally splined lower portion 14 of the steering shaft 12.

Figure 3:
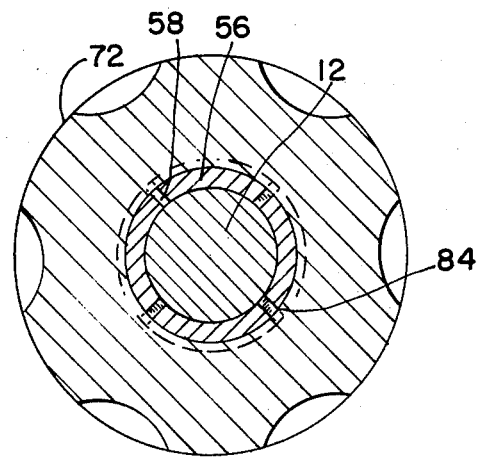
FIG. 3 is a sectional view of the adjustable steering column assembly taken along line 3—3 of FIG. 2 after the broken out sections have been reconstructed into place.

Positioned on the upper surface 44 of the steering shaft washer 42 is a split circular wedge ring 46 having the inside surface 48 parallel to the smooth surfaced upper portion 16 of the steering shaft 12. The outside surface 50 of the wedge ring 46 defines an inclined plane 52 with the base portion 54 thicker than the top portion 56 when measured in relationship to the inner surface 48. A split 58 (FIG. 3) is formed in the wedge ring 56 and generally runs from the base portion 54 through the top portion 56. The split 58 can be readily seen in FIG. 3. Three partial slits, one shown as 84 of FIG. 3, are formed in the top portion of the ring. These slits do not sever the ring as does split 58.

In a preferred embodiment the wedge ring 46 would be of a resilient plastic elastically deformable material such as "Delrin" or "Celcon", however, it could alternatively be made of other material such as a metal.

Although the split wedge ring is disclosed in this preferred embodiment, the invention would work functionally as well if a set of wedges were in place of the split wedge ring. The wedges would present slightly more complex production and assembly difficulties, however. These wedges would have the same cross sectional shape at the split wedge ring.

A steering shaft collar 60 having an inclined landing surface 62 formed therein is threadably attached to the upper end 38 of the tube 18 by means of external threads 64 on a tube 18 and internal threads 66 of the same size and pitch, on the steering shaft collar. The steering shaft collar may be tightened into position by means of the threads 64 and 66 forcing the split circular wedge ring 46 to be compressed against the smooth surfaced upper portion 14 of the steering shaft 12 by means of the inclined landing surface 62 riding up against the outside surface 50 of the wedge ring 46 and thereby wedging the wedge ring 46 into the cavity provided between the steering shaft 12 and the inclined landing surface 62. The split circular wedge ring 46 will thus tightly grip the steering shaft 12 preventing the steering shaft 12 from being telescopically movable in the tube 18.

To release and reposition the steering shaft the steering shaft collar 60 is rotated counterclockwise to release wedging pressure between the inclined landing surface 62 of the steering shaft collar 60, the split circular wedge ring 46, and hence the steering shaft 12. A gentle upward or downward tug on the steering wheel (not shown) will force the wedge ring 46 outward, freeing the steering shaft 12 and permit telescopic movement of the steering shaft 12 in the tube 18.

A decalcomania (not shown) may be positioned on the steering shaft collar to indicate direction of rotation to lock or unlock the adjustment apparatus. Alternatively, instructions indicating adjustment procedures could be formed in relief on the surface of the steering shaft collar.

There is little possibility of the steering wheel (not shown) which is attached to the steering shaft being pulled all the way out of the steering column housing or the tube. The splines of the steering column will contact the washer 42, which has a smaller internal diameter than the maximum diameter of the splined portion of the steering shaft 12, thereby limiting the travel of the steering shaft.

The threads 64 of the steering shaft collar 60 are of sufficient length to inhibit the accidental disengagement of the steering shaft collar from the tube 18. The steering shaft collar can, however, be removed for service, transportation, or other needs.

The steering shaft collar 60 is equipped with a groove 68 that provides a retaining device for an O-ring 70 positioned to ride on the smooth surfaced upper portion 14 of the steering shaft 12. In order to provide a steering shaft collar 60 that is easy to grasp the collar 60 has externally cast protrusions 72 to facilitate turning it.

The fluted surface of the steering shaft collar does not project all the way to the lower portion thereof. This is to discourage the operator from placing his adjusting hand close to the bottom of the steering shaft collar where it may be exposed to possible pinching between the collar and the housing cover plate 86.

The adjustable steering column assembly, referring to FIG. 1, is carried in the housing 74 that has a bushing 76 positioned in its upper portion 78. The bushing 76 is held in place by the housing 74 and the housing cover plate 86. The bushing 76 supports the upper end 38 of the tube 18 in the housing 74. The tube 18 is equipped with the recessed bearing surface 80 around its circumference which is provided to contain the bushing 76.

In order to reduce the transmission of direct vibration between the steering box means shaft 30 and the steering shaft 12 when the steering column is in the unextended position, an elastic buffer or resilient cap 82 is positioned on the apertured upper end 32 of the steering box means shaft 30. Several positions on the steering shaft 12 in the tube 18 are shown in the dotted line views A and B of FIG. 1 where position A would show the deepest penetration of the steering shaft 12 and position B would show the steering shaft 12 in its upmost extended position (i.e. the externally splined lower portion 14 of the steering shaft 12 contacts the steering shaft washer 42).

Thus, it is apparent that there has been provided in accordance with the invention an adjustable steering column that fully satisfies the objects, aims and advantages set forth above. Although the invention has been described in conjunction with a specific embodiment thereof it is evident that modifications and variations will be apparent to those skilled in the art in light of the foregoing description. For example, the splines on the steering shaft could be replaced with Woodruff keys. Accordingly, it is intended to embrace all such alternatives and modifications as fall within the spirit and broad scope of the appended claims.

What is claimed is:

1. An adjustable steering column means which comprises:
    a steering shaft having an externally splined lower portion and a smooth upper portion;
    a tube axially and extensibly accommodating said steering shaft having an upper and lower portion and further having internal splines terminating at the upper portion of said tube with a counterbored recess, the upper portion of said tube being externally threaded;

a steering shaft washer mounted on the recess of said tube that will allow passage therethrough of the smooth portion of said steering shaft and will prevent passage therethrough of the externally splined lower portion of said steering shaft;

a wedge ring positioned on the top of said steering shaft washer;

a steering shaft collar formed to allow passage therethrough of said steering shaft and counterbored to accommodate said wedge ring further counterbored and threaded to accommodate the upper portion of said tube.

2. An adjustable steering column means which comprises:

a steering shaft having an externally splined lower portion and a smooth upper portion;

a tube axially and extensibly accommodating said steering shaft, having an upper and lower portion and further having internal splines terminating at the upper portion of said tube with a counterbored recess the upper portion of said tube being externally threaded;

a steering shaft washer mounted on the recess of said tube that will allow passage therethrough of the smooth portion of said steering shaft and will prevent passage therethrough of the externally splined lower portion of said steering shaft;

a wedge ring positioned on top of said steering shaft washer;

a steering shaft collar formed to allow passage therethrough of said steering shaft and counterbored to accommodate said wedge ring further counterbored and threaded to accommodate the upper portion of said tube;

a steering box means shaft positioned in the lower portion of said tube;

an attaching means coupling said steering box means shaft to the lower portion of said tube.

3. An adjustable steering column assembly which comprises:

a steering shaft having an externally splined lower portion and a smooth upper portion;

a tube axially and extensibly accommodating said steering shaft, having internal splines nominally compatible with the external splines of said steering shaft, an externally threaded upper portion, a counterbored upper portion, said tube having a recess formed on the outside of the upper portion of said tube and said tube having an aperture passing therethrough at the lower portion of said tube;

a steering shaft washer mounted in the counterbored upper portion of said tube that will allow passage therethrough of the smooth portion of said steering shaft and will prevent passage therethrough of the externally splined lower portion of said steering shaft;

a wedge ring located on the top of said steering shaft washer having a flat interior surface parallel to the surface of said steering shaft and an inclined surface on the exterior of said wedge ring such that the base of said wedge ring is wider than the top of the wedge ring, said wedge ring being split from the top to the base thereof;

a steering shaft collar having a passage therethrough for passing said steering shaft further having a threaded counterbore for affording cooperative mating with the externally threaded upper portion of said tube and further having an inclined surface in the counterbore of said steering shaft collar that is of the same incline and a steering box means shaft projecting into the lower portion of said tube, said steering box means shaft having an aperture therethrough;

an alignment pin passing through the aperture of the lower portion of said tube and the aperture of said steering box means shaft thereby linking said tube to said steering box means shaft;

a housing having a passage therethrough, and further having a recess at the upper portion thereof;

a bushing mounted in the recess at the upper portion of said housing positioned such that when said tube is inserted in said housing the recess of the outside of the upper portion of said tube will be in rotatable contact with said bushing.

4. The invention in accordance with claim 3 wherein said wedge ring is formed of an elastically deformable material that will conform to the smooth surface of said steering shaft when under compression resulting from the tightening of said steering shaft collar by means of the inneraction provided through the internal threads of said steering shaft collar and the external threads of said tube such that said steering shaft will be locked in position with respect to said tube.

5. The invention in accordance with claim 3 wherein said wedge ring has slits from the top of the wedge ring to a point above the base of the wedge ring.

6. The invention in accordance with claim 3 wherein said wedge ring is composed of segments having the same vertical cross sectional configuration as said wedge ring.

7. The invention in accordance with claim 3 wherein said steering shaft collar can be rotated to increase or decrease the force applied to said wedge ring thereby increasing or decreasing the locking force that said wedge ring applies under compression to said steering shaft.

8. The invention in accordance with claim 3 wherein said steering box means shaft is enveloped by a resilient cap whereby direct contact between said steering shaft and said steering pump shaft means can be avoided.

9. A telescopically adjustable steering column means having a steering shaft, a threaded tube for receiving the steering shaft in an axially extensible relationship, a housing, and further comprising:

a steering shaft collar having a bore therethrough affording passage of said steering shaft and being counterbored and threaded to receive said tube, and further being formed with an inclined surface, and having a groove formed therein at an upper portion of said steering shaft collar, said steering shaft collar also having a counterbored recess in the lower portion thereof, and also having externally cast protrusions formed parallel to the major axis of said steering shaft collar;

an O-ring positioned in the groove of the upper portion of said steering shaft collar;

a wedge means is accommodated by the inclined surface and further allows passage of said steering shaft therethrough;

a steering shaft washer having a circular aperture therethrough that will allow limited passage of said steering shaft positioned between said tube and said wedge means.

10. A telescopically adjustable steering column assembly which comprises:

a steering shaft having a smooth surfaced upper portion and an externally splined lower portion nominally larger in outside diameter than the upper portion of said steering shaft;

a tube receiving said steering shaft having a splined interior compatible with the splines on said steering shaft, and formed on an upper portion of said tube an external recessed bearing journal said tube also having an aperture passing through the lower portion of said tube and, in the upper portion a counterbored recess, further having a threaded portion on the exterior surface of the upper end thereof;

a steering shaft washer having a top and a bottom surface and an outer diameter approximately equal to the diameter of the counterbored recess in said tube in position therein, and further having a circular aperture therethrough that will allow passage of the smooth surfaced upper portion of said steering shaft and will prevent passage of the splined lower portion of said steering shaft as the external splines will contact the bottom surface of said steering shaft washer;

a wedge ring which rests on the top surface of said steering shaft washer of resilient material which encircles said steering shaft, further having a flat interior surface, an inclined outer surface, said wedge ring being wider at the base portion than at the top portion thereof, and being split from the base portion through the top portion such that said wedge ring is noncontinuous;

a steering shaft collar having a bore therethrough for the passage of said steering shaft and being counterbored and internally threaded to receive the upper portion of said tube, and further being formed with an inclined surface similar in slope and diameter but wider than the inclined outer surface of said wedge ring, and having a groove formed therein at an upper portion of said steering shaft collar, the exterior of said steering shaft collar having externally cast protrusions running parallel to the major axis of said steering shaft collar, said steering shaft collar having a counterbored recess in the lower portion thereof;

an O-ring positioned in the groove formed in the upper portion of said steering shaft collar such that when said steering shaft collar is positioned on said steering shaft and said tube the O-ring will be in contact with both the smooth surfaced upper portion of said steering shaft and the surfaces of the groove in the upper portion of said steering shaft collar;

a steering box means shaft extending into the interior of said tube having a resilient cap to isolate the steering box means shaft from said steering shaft means and further having an aperture passing through said steering box means shaft;

an alignment pin passing through the aperture in said tube and the aperture in said steering box means shaft engageably connected with said tube and said steering box means shaft;

a housing having a void interior for containing said steering shaft and said tube having an opening at the lower end for receiving said steering box means shaft and a recess formed in the upper end of said housing;

a bushing positioned on the recessed journal at the upper end of said tube and carried in the upper end of said housing which allows rotation of the tube about the major axis of said tube, said bushing preventing upward or downward movement of said tube;

a mounting panel for positioning said housing and retaining said bushing in the recess formed in the upper end of said housing said mounting panel extending upwardly into the recess in the lower portion of said steering shaft collar.

* * * * *